No. 884,597. PATENTED APR. 14, 1908.
J. MARSON.
PROCESS OF MAKING FELT FOR PIANO HAMMERS.
APPLICATION FILED MAY 1, 1906.
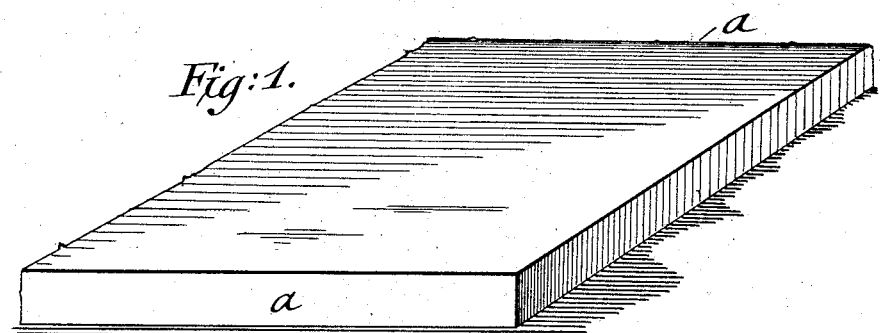
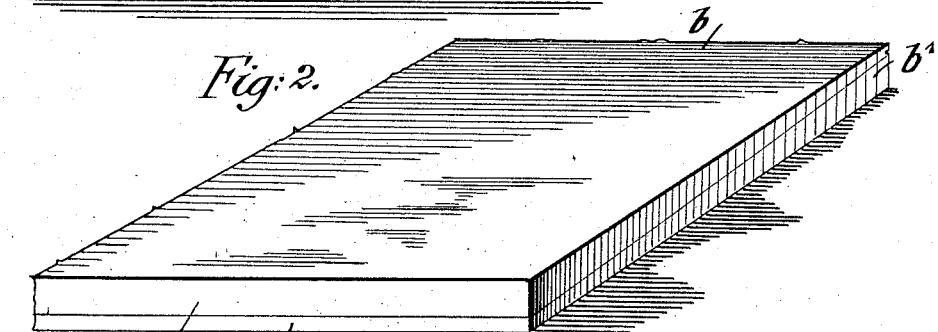
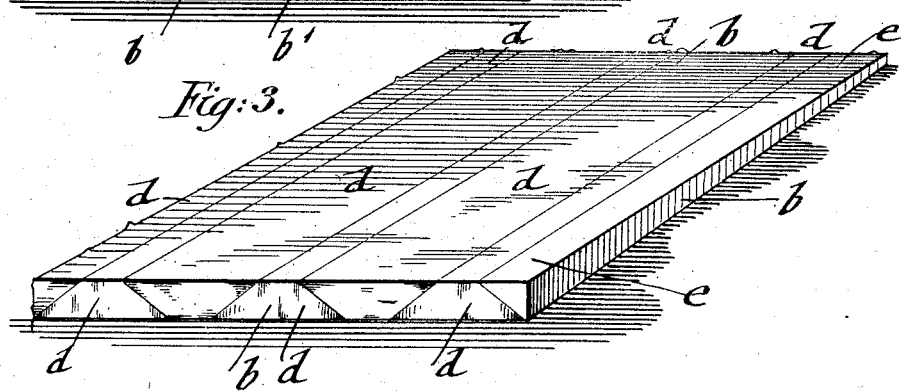
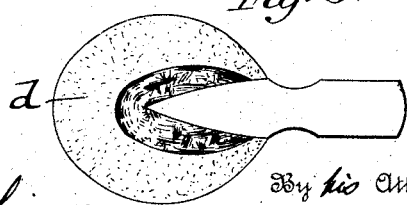

UNITED STATES PATENT OFFICE.

JOHN MARSON, OF RAHWAY, NEW JERSEY, ASSIGNOR TO HERBERT W. TAYLOR, OF MONTCLAIR, NEW JERSEY.

PROCESS OF MAKING FELT FOR PIANO-HAMMERS.

No. 884,597.      Specification of Letters Patent.      Patented April 14, 1908.

Application filed May 1, 1906. Serial No. 314,641.

*To all whom it may concern:*

Be it known that I, JOHN MARSON, a citizen of the United States, residing at No. 22 Westfield avenue, Rahway, in the county of Union and State of New Jersey, have invented certain new and useful Improvements in Processes of Making Felt for Piano-Hammers, of which the following is a specification.

This invention relates to an improved process of making felt for piano-hammers, the object of the invention being to simplify and cheapen the construction of the felt which is used for the hammer-heads of piano-actions, and also to improve the quality and texture of such felt.

The felt commonly used in the manufacture of piano-hammers is produced in a long web of wedge shape, which is made of about one and one-eighth inches thick at one edge and a quarter of an inch at the opposite edge, said web being made by a series of carding-rolls which are arranged to deposit layers of felt of different widths upon a traveling apron so as to produce felt which is thicker at one edge than at the other. These layers are then thoroughly amalgamated in the process of hardening and fulling, and the irregular upper surface of the felt is then smoothed off and straightened by the sandpapering process. This method requires complicated machinery and is connected with considerable loss of time and labor.

In the present invention any ordinary felting apparatus may be employed for producing a layer of uniform thickness, which is then further treated by my improved process, which consists in cutting a web or layer of felting of uniform thickness diagonally into two sections having their adjacent faces suitably inclined, and then fulling the sections so as to finish the same.

The invention consists further of a process of making felt for piano-hammers by making first a layer of felt of uniform thickness, having the fiber crossed to strengthen the texture, then hardening the layers, next dividing the layer diagonally to its width into two sections having their adjacent faces suitably inclined, and lastly fulling the sections for finishing the same.

In the accompanying drawings, Figure 1 represents a perspective view of a web or layer of felt made uniform in thickness throughout its length, Fig. 2 is a perspective view showing the same layer cut diagonally across its width into two tapering sections of felting, Fig. 3 is a perspective view showing the cutting up of each layer of felt into transverse layers of felt for the piano hammer-heads, Fig. 4 is a perspective view of an additional strip of hammer-felt, and Fig. 5 shows the application of the felt to the shank of a piano-hammer.

Similar letters of reference indicate corresponding parts in the different figures of the drawings.

Referring to the drawings, $a$ represents a web or layer of felt of uniform thickness which is made in any ordinary felting machine and in such a manner that the different layers of the web are made to cross each other until a web of the required thickness, usually one and one-eighth inches, is completed. This layer is then hardened and divided diagonally across the width for the full length of the same, so as to obtain two similar and equal sections $b$, $b^1$ which taper from one edge of greater thickness to the opposite edge of smaller thickness. By thus cutting diagonally across the layer $a$, two webs or layers for making hammer-felts of the required shape are obtained, whose adjacent surfaces are inclined, as shown in Fig. 2. These transversely-tapering sections are then subjected to fulling, which condenses the felt and gives it the proper texture and firmness desired. The surface of the tapering sections is then smoothed by sandpaper in the usual manner, but no material portion of the same has to be removed as in the old process of making such hammer-felts, by which method of depositing layers of felt one upon the other, it was impossible to cross the fibers in the felt, which is desirable as it produces a web of felt of firmer and more tenacious texture. The transversely-tapering sections are then cut up into transverse strips $d$, as shown in Figs. 3 and 4, by cutting the web or layer of felt transversely across its width into trapeziform strips, the same being then used in making the heads of piano-hammers in the usual manner. There is only a small loss of felt at the beginning and at the end of each of the webs $b$, $b^1$, in the form of a tapering prismatic strip $d$, as shown in Fig. 1.

Having thus described my invention, I claim as new and desire to secure by Letters Patent:

The process herein described of making felt for piano-hammers, which consists in first making a layer of felt of uniform thickness having the fibers crossed to strengthen the texture; second, hardening the web or layer; third, dividing the layer transversely to its width diagonally or obliquely into two sections having their adjacent faces suitably inclined, fourth, fulling the sections for finishing the same; and, fifth, cutting the sections into trapeziform strips.

In testimony, that I claim the foregoing as my invention, I have signed my name in presence of two subscribing witnesses.

JOHN MARSON.

Witnesses:
PAUL GOEPEL,
HENRY J. SUHRBIER.